United States Patent
Hiratsuka (10) Patent No.: US 12,119,489 B2
(45) Date of Patent: Oct. 15, 2024

(54) POSITIVE ELECTRODE ACTIVE MATERIAL FOR NONAQUEOUS ELECTROLYTE SECONDARY BATTERIES COMPRISING NICKEL-CONTAINING LITHIUM TRANSITION METAL OXIDE, NONAQUEOUS ELECTROLYTE SECONDARY BATTERY COMPRISING SAME, AND METHOD FOR PRODUCING POSITIVE ELECTRODE ACTIVE MATERIAL FOR NONAQUEOUS ELECTROLYTE SECONDARY BATTERIES COMPRISING NICKEL-CONTAINING LITHIUM TRANSITION METAL OXIDE

(71) Applicant: Panasonic Intellectual Property Management Co., Ltd., Osaka (JP)

(72) Inventor: Hidekazu Hiratsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 16/757,100

(22) PCT Filed: Feb. 7, 2019

(86) PCT No.: PCT/JP2019/004325
§ 371 (c)(1),
(2) Date: Apr. 17, 2020

(87) PCT Pub. No.: WO2019/167582
PCT Pub. Date: Sep. 6, 2019

(65) Prior Publication Data
US 2020/0343549 A1    Oct. 29, 2020

(30) Foreign Application Priority Data
Feb. 28, 2018 (JP) ................. 2018-034568

(51) Int. Cl.
*H01M 4/52* (2010.01)
*H01M 4/131* (2010.01)
(Continued)

(52) U.S. Cl.
CPC .......... *H01M 4/525* (2013.01); *H01M 4/131* (2013.01); *H01M 4/1391* (2013.01);
(Continued)

(58) Field of Classification Search
CPC .... H01M 4/525; H01M 4/131; H01M 4/1391; H01M 4/485; H01M 4/505;
(Continued)

(56) References Cited

U.S. PATENT DOCUMENTS

| 2012/0119167 A1 | 5/2012 | Matsumoto et al. |
| 2017/0288223 A1 | 10/2017 | Ogawa et al. |
| 2019/0074511 A1* | 3/2019 | Blangero ............... C01G 53/50 |

FOREIGN PATENT DOCUMENTS

| CN | 103151512 A | 6/2013 |
| JP | 2010-64944 A | 3/2010 |

(Continued)

OTHER PUBLICATIONS

Machine translation of JP2010064944A, Kuzuo et al., 2010 (Year: 2010).*

(Continued)

*Primary Examiner* — Wyatt P McConnell
(74) *Attorney, Agent, or Firm* — WHDA, LLP (57) ABSTRACT

A positive electrode active material for nonaqueous electrolyte secondary batteries includes a Ni-containing lithium transition metal oxide in the form of secondary particles formed by the aggregation of primary particles of the oxide, the proportion of Ni in the lithium transition metal oxide being not less than 80 mol % relative to the total number of moles of metal element(s) except Li, the average particle (Continued)

size of the primary particles being not less than 0.5 μm, the average particle size of the secondary particles being not less than 8 μm, the lithium transition metal oxide having a Ni disorder of not more than 3% and a crystallite size in the range of 100 to 200 nm according to X-ray diffractometry.

6 Claims, 2 Drawing Sheets

(51) Int. Cl.
  *H01M 4/1391*   (2010.01)
  *H01M 4/485*   (2010.01)
  *H01M 4/505*   (2010.01)
  *H01M 4/525*   (2010.01)
  *H01M 10/0525*   (2010.01)
  *H01M 4/02*   (2006.01)

(52) U.S. Cl.
  CPC ........... *H01M 4/485* (2013.01); *H01M 4/505* (2013.01); *H01M 10/0525* (2013.01); *H01M 2004/028* (2013.01)

(58) Field of Classification Search
  CPC ....... H01M 10/0525; H01M 2004/028; H01M 4/0471; C01P 2002/60; C01P 2002/72; C01P 2004/03; C01P 2004/61; C01P 2004/62; C01P 2006/40; C01G 53/50; Y02E 60/10
  See application file for complete search history.

(56) References Cited

FOREIGN PATENT DOCUMENTS

| | | | | |
|---|---|---|---|---|
| JP | 2010064944 A | * | 3/2010 | ............ C01G 53/00 |
| JP | 2016-12500 A | | 1/2016 | |
| JP | 2017-188445 A | | 10/2017 | |
| WO | 2011/016372 A1 | | 2/2011 | |
| WO | WO 2017/042655 A1 | * | 3/2017 | ............ H01M 4/525 |

OTHER PUBLICATIONS

International Search Report dated May 7, 2019, issued in counterpart International Application No. PCT/JP2019/004325 (1 page).
English Translation of Chinese Search Report dated Aug. 12, 2022, issued in counterpart to CN Application No. 201980004985.6. (3 pages).

* cited by examiner

POSITIVE ELECTRODE ACTIVE MATERIAL FOR NONAQUEOUS ELECTROLYTE SECONDARY BATTERIES COMPRISING NICKEL-CONTAINING LITHIUM TRANSITION METAL OXIDE, NONAQUEOUS ELECTROLYTE SECONDARY BATTERY COMPRISING SAME, AND METHOD FOR PRODUCING POSITIVE ELECTRODE ACTIVE MATERIAL FOR NONAQUEOUS ELECTROLYTE SECONDARY BATTERIES COMPRISING NICKEL-CONTAINING LITHIUM TRANSITION METAL OXIDE

TECHNICAL FIELD

The present disclosure relates to a positive electrode active material for nonaqueous electrolyte secondary batteries, to a nonaqueous electrolyte secondary battery, and to a method for producing a positive electrode active material for nonaqueous electrolyte secondary batteries.

BACKGROUND ART

Nonaqueous electrolyte secondary batteries include a positive electrode, a negative electrode and a nonaqueous electrolyte and are charged and discharged by the migration of ions such as lithium ions between the positive electrode and the negative electrode. Secondary batteries of this type show a high output and a high energy density, and have recently gained widespread use.

Some known positive electrode active materials used in the positive electrodes of nonaqueous electrolyte secondary batteries are Ni-containing lithium transition metal oxides, Co-containing lithium transition metal oxides and Mn-containing lithium transition metal oxides. Of these materials, Ni-containing lithium transition metal oxides are being studied actively on account of the fact that they allow for the production of batteries which are inexpensive and are of high capacity as compared to when other positive electrode active materials such as Co-containing lithium transition metal oxides are used (for example, PTL 1 and 2).

CITATION LIST

Patent Literature

PTL 1: Japanese Published Unexamined Patent Application No. 2017-188445
PTL 2: International Publication No. 2011/016372

SUMMARY OF INVENTION

Ni-containing lithium transition metal oxides which contain 80 mol % or more Ni relative to the total number of moles of metal elements except Li hold great promise of enhancing the capacity of nonaqueous electrolyte secondary batteries. Unfortunately, positive electrode active materials of this type are thermally unstable. Conventional techniques that improve thermal stability exist. However, such techniques, when applied to Ni-excess lithium transition metal oxides, offer no improvements in thermal stability or may improve thermal stability at the cost of problems such as a decrease in battery capacity and the generation of gas in hot environments. The term thermal stability means the amount of heat generated by the positive electrode active material at the time of charging. A low thermal stability (a large amount of heat generation) may lead to a decrease in battery performance. Further, gas generation stems from, for example, the oxidative decomposition of the positive electrode active material during charging in a hot environment (for example, 60° C. or above). A large amount of gas generation may lead to a decrease in battery performance.

An object of the present disclosure is therefore to provide a Ni-containing lithium transition metal oxide having a Ni proportion of not less than 80 mol % relative to the total number of moles of metal element(s) except Li which, when used as a positive electrode active material for nonaqueous electrolyte secondary batteries, can attain a smaller decrease in thermal stability with less lowering in battery capacity and less generation of gas in a hot environment.

A positive electrode active material for nonaqueous electrolyte secondary batteries according to an aspect of the present disclosure includes a Ni-containing lithium transition metal oxide in the form of secondary particles formed by aggregation of primary particles of the oxide, the proportion of Ni in the lithium transition metal oxide being not less than 80 mol % relative to the total number of moles of metal element(s) except Li, the average particle size of the primary particles being not less than 0.5 µm, the average particle size of the secondary particles being not less than 8 µm, the lithium transition metal oxide having a Ni disorder of not more than 3% and a crystallite size in the range of 100 to 200 nm according to X-ray diffractometry.

A nonaqueous electrolyte secondary battery according to an aspect of the present disclosure includes a positive electrode including a positive electrode active material, a negative electrode and a nonaqueous electrolyte, the positive electrode active material including the above positive electrode active material for nonaqueous electrolyte secondary batteries.

A method for producing a positive electrode active material for nonaqueous electrolyte secondary batteries according to an aspect of the present disclosure includes a first calcination step of calcining a first mixture including a lithium compound and a transition metal compound containing 80 mol % or more Ni, and a second calcination step of calcining a second mixture including a calcined product obtained in the first calcination step and a lithium compound, the content of lithium in the first mixture expressed as a molar ratio to the total amount of transition metal(s) being 0.7 to 1.1, the calcining of the first mixture being performed at a temperature of 700° C. to 1000° C., the content of lithium in the second mixture expressed as a molar ratio to the total amount of transition metal(s) being 0.01 to 0.3, the calcining of the second mixture being performed at a temperature of 600° C. to 900° C.

Aspects of the present disclosure make it possible to attain a smaller decrease in thermal stability while reducing the lowering in battery capacity and the amount of gas generation in a hot environment.

DESCRIPTION OF EMBODIMENTS

After extensive studies, the present inventor has found that a Ni-containing lithium transition metal oxide having a Ni proportion of not less than 80 mol % attains a smaller decrease in thermal stability with less lowering in battery capacity and less generation of gas in a hot environment when the oxide is controlled appropriately in terms of particle size, Ni disorder and crystallite size. The present inventor thus developed a positive electrode active material for nonaqueous electrolyte secondary batteries which has a configuration described below.

A positive electrode active material for nonaqueous electrolyte secondary batteries according to an aspect of the present disclosure includes a Ni-containing lithium transition metal oxide in the form of secondary particles formed by aggregation of primary particles of the oxide, the proportion of Ni in the lithium transition metal oxide being not less than 80 mol % relative to the total number of moles of metal element(s) except Li, the average particle size of the primary particles being not less than 0.5 μm, the average particle size of the secondary particles being not less than 8 μm, the lithium transition metal oxide having a Ni disorder of not more than 3% and a crystallite size in the range of 100 to 200 nm according to X-ray diffractometry. Here, the Ni disorder means the proportion of Ni element incorporated in lithium sites in the crystal structure. When, for example, the Ni-containing lithium transition metal oxide has a layered structure, the Ni disorder means the proportion of nickel ions incorporated in 3a Wyckoff sites which are to be occupied by lithium ions.

The Ni-containing lithium transition metal oxide having a Ni proportion of 80 mol % or above is controlled so that the average primary and secondary particle sizes, the Ni disorder and the crystallite size fall in the aforementioned ranges. The Ni-containing lithium transition metal oxide attains a smaller decrease in thermal stability with less lowering in battery capacity and less generation of gas in a hot environment probably because, for example, the above control stabilizes the crystal structure and enhances the lithium ion conductivity and diffusibility.

An example of nonaqueous electrolyte secondary batteries according to an aspect of the present disclosure will be described hereinbelow.

A nonaqueous electrolyte secondary battery according to an example embodiment includes a positive electrode, a negative electrode and a nonaqueous electrolyte. A separator is preferably disposed between the positive electrode and the negative electrode. Specifically, the structure is such that the positive electrode and the negative electrode are wound together via a separator to form a wound electrode assembly, and the electrode assembly and the nonaqueous electrolyte are accommodated in an exterior case. The electrode assembly is not limited to a wound electrode assembly, and may be other form of electrode assemblies such as a stacked electrode assembly in which the positive electrodes and the negative electrodes are stacked on top of one another via separators. The shape of the nonaqueous electrolyte secondary battery is not particularly limited and may be, for example, cylindrical, prismatic, coin, button or laminate.

[Positive Electrodes]

For example, the positive electrode is composed of a positive electrode current collector such as a metal foil, and a positive electrode mixture layer disposed on the positive electrode current collector. The positive electrode current collector may be, for example, a foil of a metal that is stable at positive electrode potentials, such as aluminum, or a film having such a metal as a skin layer.

The positive electrode mixture layer includes a positive electrode active material. Further, the positive electrode mixture layer preferably includes a conductive agent and a binder in addition to the positive electrode active material. The thickness of the positive electrode mixture layer is, for example, not less than 10 μm.

For example, the positive electrode may be fabricated by preparing a positive electrode mixture slurry including a positive electrode active material, a conductive agent and a binder, applying the positive electrode mixture slurry onto a positive electrode current collector, drying the wet film to form a positive electrode mixture layer, and pressing the positive electrode mixture layer.

Examples of the conductive agents include carbon materials such as carbon black, acetylene black, Ketjen black and graphite. The conductive agents may be used singly, or two or more may be used in combination. Examples of the binders include fluororesins such as polytetrafluoroethylene (PTFE) and polyvinylidene fluoride (PVdF), polyacrylonitrile (PAN), polyimides, acrylic resins and polyolefins. These resins may be used in combination with, for example, carboxymethylcellulose (CMC) or salts thereof, and polyethylene oxide (PEO). These materials may be used singly, or two or more may be used in combination.

Figure 1:
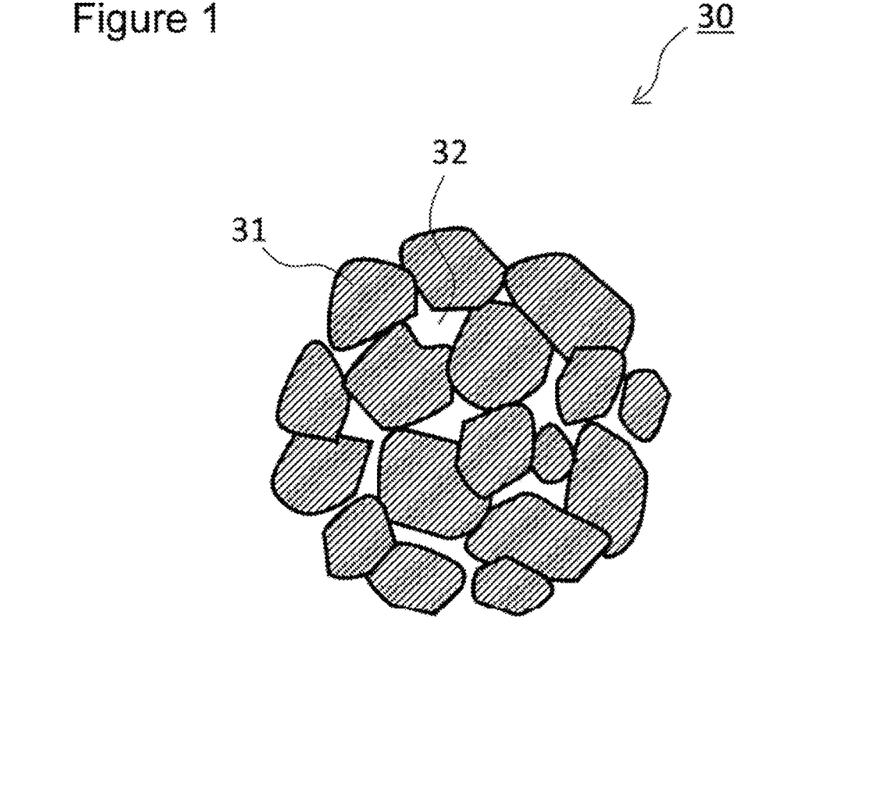
FIG. 1 is a schematic enlarged sectional view of a particle constituting a positive electrode active material.

FIG. 1 is a schematic enlarged sectional view of a particle constituting a positive electrode active material. As illustrated in FIG. 1, the positive electrode active material includes a secondary particle 30 which is an aggregation of primary particles 31 of a Ni-containing lithium transition metal oxide. The secondary particle 30 of the lithium transition metal oxide has voids 32 formed between the primary particles 31.

The Ni-containing lithium transition metal oxide is a Ni-containing lithium transition metal oxide which has a Ni proportion of not less than 80 mol % relative to the total number of moles of metal element(s) except lithium (Li). The Ni-containing lithium transition metal oxide may include an element other than Ni and Li. From points of view such as the stability of the crystal structure, the oxide preferably includes at least one element selected from, for example, cobalt (Co), manganese (Mn), magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga) and indium (In). It is more preferable that the oxide include at least one of Co and Mn and further include at least one element selected from magnesium (Mg), zirconium (Zr), boron (B), calcium (Ca), molybdenum (Mo), tungsten (W), aluminum (Al), chromium (Cr), vanadium (V), cerium (Ce), titanium (Ti), iron (Fe), sodium (Na), potassium (K), gallium (Ga) and Indium (In).

For example, the Ni-containing lithium transition metal oxide is represented by the composition formula $Li_aNi_xCo_yM_{(1-x-y)}O_2$ (wherein $1.00 \leq a \leq 1.15$, $0.8 \leq x < 1.0$, $0 \leq y \leq 0.2$, and M is an element other than Li, Ni and Co). The letter M in the formula preferably includes at least one element selected from manganese (Mn), magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga) and indium (In). Further, it is preferable that M include Mn and at least one element selected from magnesium (Mg), zirconium (Zr), boron (B), calcium (Ca), molybdenum (Mo), tungsten (W), aluminum (Al), chromium (Cr), vanadium (V), cerium (Ce), titanium (Ti), iron (Fe), sodium (Na), potassium (K), gallium (Ga) and indium (In).

In the Ni-containing lithium transition metal oxide, the average particle size of the primary particles 31 forming the secondary particles 30 is not less than 0.5 µm, and, for purposes such as to further reduce the lowering in battery capacity, is preferably in the range of, for example, 0.5 µm to 2 µm.

The average particle size of the primary particles 31 of the Ni-containing lithium transition metal oxide may be determined by analyzing a sectional SEM image obtained with a scanning electron microscope (SEM). For example, the positive electrode may be buried into a resin and processed with Cross Section Polisher (CP) or the like to expose a cross section of the positive electrode mixture layer, which is then photographed by SEM. Alternatively, a powder of the lithium transition metal oxide may be buried into a resin and processed with Cross Section Polisher (CP) or the like to expose cross sections of the particles of the Ni-containing lithium transition metal oxide, which are then photographed by SEM. With respect to the sectional SEM image, thirty primary particles are randomly selected. The grain boundaries of the selected thirty primary particles are observed to identify the outlines of the primary particles. The longer diameters (the longest diameters) of the respective thirty primary particles are measured, and the results are averaged to give the average particle size of the primary particles.

The average particle size of the secondary particles 30 of the Ni-containing lithium transition metal oxide is not less than 8 µm, and, for purposes such as to further reduce the lowering in battery capacity, is preferably in the range of, for example, 8 µm to 20 µm, and more preferably in the range of 10 µm to 18 µm. The average particle size of the secondary particles may be similarly determined from the sectional SEM image. Specifically, thirty secondary particles may be randomly selected from the sectional SEM image, the grain boundaries of the selected thirty secondary particles may be observed to identify the outlines of the secondary particles, and the longer diameters (the longest diameters) of the respective thirty secondary particles may be measured, the results being then averaged to give the average particle size of the secondary particles.

The Ni disorder in the Ni-containing lithium transition metal oxide is not more than 3% according to X-ray diffractometry. For purposes such as to attain a smaller decrease in thermal stability or to further reduce the lowering in battery capacity or the amount of gas generation in a hot environment, the Ni disorder is preferably not more than 2%, and more preferably in the range of 1 to 2%. If the Ni disorder exceeds 3%, the lithium ion diffusibility is lowered to cause a decrease in battery capacity, or the crystal structure is destabilized to cause a decrease in thermal stability or an increase in the amount of gas generation in a hot environment.

The Ni disorder may be determined from the results of Rietveld analysis of an X-ray diffraction pattern obtained by X-ray diffractometry of the Ni-containing lithium transition metal oxide. Specifically, an X-ray diffraction pattern may be measured with a powder X-ray diffractometer (trade name "D8 ADVANCE" manufactured by Bruker AXS), and the disorder may be calculated with respect to the X-ray diffraction pattern using Rietveld analysis software TOPAS (manufactured by Bruker AXS).

The X-ray diffractometry is performed under conditions where the detector is PSD (LYNX EYE), the tube is CuKα1 (wavelength: 1.5418 Å), the tube voltage is 40 kV, the tube current is 40 mA, the slit width is 0.3° the step width is 0.03, the measurement time per step is 1 sec, and the measurement range is from 10 to 120.

The crystallite size of the Ni-containing lithium transition metal oxide is in the range of 100 to 200 nm, and, for purposes such as to attain a smaller decrease in thermal stability or to further reduce the amount of gas generation in a hot environment, is preferably in the range of 120 to 180 nm. In the case where, for example, the lithium transition metal oxide has a layered rock salt crystal structure, the crystallite size in the present specification is the crystallite size in (110) vector direction that is perpendicular to (003) vector direction in which the layers are stacked.

The crystallite size of the Ni-containing lithium transition metal oxide is calculated by analyzing an X-ray diffraction pattern obtained by X-ray diffractometry, using a whole powder pattern decomposition method (hereinafter, written as the "WPPD method").

The analysis procedure in the WPPD method is as follows.

Step 1: Start software (TOPAS) and load measurement data.

Step 2: Set Emission Profile (select Cu tube and Bragg-Brentano focusing optical geometry).

Step 3: Set Background (use Legendre polynomial as profile function, and set the number of terms to 8 to 20).

Step 4: Set Instrument (use Fundamental Parameter, and input slit conditions, filament length and sample length).

Step 5: Set Corrections (use Sample displacement, and use Absorption too when the sample bulk density in the sample holder is low, in which case Absorption is fixed to the linear absorption coefficient of the sample).

Step 6: Set Crystal Structure (set the space group to R3-m; use lattice constant, crystallite size and lattice strain; and set the widening of the profile due to crystallite size and lattice strain to Lorenz function).

Step 7: Perform Calculations (refine background, sample displacement, diffraction intensity, lattice constant, crystallite size and lattice strain; and employ Le-ball method for calculations).

Step 8: End analysis when the standard deviation of the crystallite size is 6% or below of the refined value. If the standard deviation is greater than 6%, proceed to Step 9.

Step 9: Set the widening of the profile due to lattice strain to Gauss function (do not change the setting of crystallite size at Lorenz function).

Step 10: Perform Calculations (refine background, sample displacement, diffraction intensity, lattice constant, crystallite size and lattice strain).

Step 11: End analysis when the standard deviation of the crystallite size is 6% or below of the refined value. If the standard deviation is greater than 6%, analysis is impossible.

For example, the content of the Ni-containing lithium transition metal oxide is preferably not less than 90 mass % of the total amount of the positive electrode active materials, and may be substantially 100 mass % of the positive electrode active material. While still achieving the advantageous effects of the present invention, the positive electrode active materials may include a lithium transition metal oxide which does not satisfy the above range of the parameter such as the average primary and secondary particle sizes, the Ni disorder or the crystallite size.

Hereinbelow, a method for producing a positive electrode active material of the present embodiment will be described. By the method for producing a positive electrode active material of the present embodiment, a Ni-containing lithium transition metal oxide may be obtained which has average primary and secondary particle sizes, a Ni disorder and a crystallite size in the ranges specified hereinabove.

The method for producing a positive electrode active material according to the present embodiment includes a first calcination step of calcining a first mixture including a lithium compound and a transition metal compound containing 80 mol % or more Ni, and a second calcination step of calcining a second mixture including the calcined product obtained in the first calcination step and a lithium compound. The content of lithium in the first mixture expressed as a molar ratio to the total amount of the transition metal(s) is 0.8 to 1.1. The calcining of the first mixture is performed at a temperature of 700° C. to 1000° C. The content of lithium in the second mixture expressed as a molar ratio to the total amount of the transition metal(s) is 0.01 to 0.3. The calcining of the second mixture is performed at a temperature of 600° C. to 900° C.

<First Calcination Step>

The content of lithium in the first mixture expressed as a molar ratio to the total amount of the transition metal(s) is 0.7 to 1.1, and preferably 0.8 to 1.0. The calcining of the first mixture is performed at a temperature of 700° C. to 1000° C., and preferably 750° C. to 900° C. The calcination time is preferably 3 hours to 10 hours. If the conditions such as the lithium content in the first mixture and the calcination temperature are outside the above ranges, the final Ni-containing lithium transition metal will fail to satisfy the above range of the average primary and secondary particle sizes, the Ni disorder or the crystallite size.

Examples of the lithium compounds contained in the first mixture include $Li_2CO_3$, LiOH, $Li_2O_3$, $Li_2O$, $LiNO_3$, $LiNO_2$, $Li_2SO_4$, $LiOH \cdot H_2O$, LiH and LiF.

The transition metal compound contained in the first mixture is not particularly limited as long as the compound contains 80 mol % or more Ni. For reasons such as that the final Ni-containing lithium transition metal oxide has a more stable crystal structure, it is preferable to use a compound containing Ni and one of Mn and Co.

<Second Calcination Step>

The content of lithium in the second mixture expressed as a molar ratio to the total amount of the transition metal(s) is 0.01 to 0.3, and preferably 0.05 to 0.2. The calcining of the second mixture is performed at a temperature of 600° C. to 900° C., and preferably 700° C. to 800° C. The calcination time is preferably 5 hours to 20 hours. If the conditions such as the lithium content in the second mixture and the calcination temperature are outside the above ranges, the final Ni-containing lithium transition metal will fail to satisfy the above range of the average primary and secondary particle sizes, the Ni disorder or the crystallite size.

The lithium compound contained in the second mixture may be the same as or different from the lithium compound contained in the first mixture. Examples thereof include $Li_2CO_3$, LiOH, $Li_2O_3$, $Li_2O$, $LiNO_3$, $LiNO_2$, $Li_2SO_4$, $LiOH \cdot H_2O$, $Li_3PO_4$, LiH and LiF.

[Negative Electrodes]

For example, the negative electrode is composed of a negative electrode current collector such as a metal foil, and a negative electrode mixture layer disposed on the current collector. The negative electrode current collector may be, for example, a foil of a metal that is stable at negative electrode potentials, such as copper, or a film having such a metal as a skin layer. The negative electrode mixture layer includes a negative electrode active material and preferably further includes additional components such as a binder. For example, the negative electrode may be fabricated by preparing a negative electrode mixture slurry including components such as a negative electrode active material and a binder, applying the negative electrode mixture slurry onto a negative electrode current collector, drying the wet film to form a negative electrode mixture layer, and pressing the negative electrode mixture layer.

The negative electrode active material is not particularly limited as long as it can reversibly store and release lithium ions. Examples thereof include carbon materials such as natural graphite and artificial graphite, metals which can be alloyed with lithium such as silicon (Si) and tin (Sn), and alloys and composite oxides containing such metal elements as Si and Sn. The negative electrode active materials may be used singly, or two or more may be used in combination.

Examples of the binders include fluororesins, PAN, polyimides, acrylic resins and polyolefins, similarly to the case of the positive electrode. When the mixture slurry is prepared using an aqueous solvent, for example, CMC or a salt thereof, styrene-butadiene rubber (SBR), polyacrylic acid (PAA) or a salt thereof, or polyvinyl alcohol (PVA) is preferably used.

[Separators]

For example, the separator is a porous sheet having ion permeability and insulating properties. Specific examples of the porous sheets include microporous thin films, woven fabrics and nonwoven fabrics. For example, the separator is composed of a polyolefin such as polyethylene or polypropylene, cellulose, etc. The separator may be a stack including a cellulose fiber layer and a thermoplastic resin fiber layer such as of a polyolefin. Alternatively, the separator may be a multilayer separator including a polyethylene layer and a polypropylene layer, and may have a surface layer formed of an aramid resin or a surface layer containing an inorganic filler.

[Nonaqueous Electrolytes]

The nonaqueous electrolyte includes a nonaqueous solvent and a solute (an electrolyte salt) dissolved in the nonaqueous solvent. Examples of the nonaqueous solvents include esters, ethers, nitriles, amides such as dimethylformamide, isocyanates such as hexamethylenediisocyanate, and mixtures of two or more kinds of these solvents. The nonaqueous solvent may include a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile, and 1,3,5-pentanetricarbonitrile.

Examples of the halogenated solvents include fluorinated cyclic carbonate esters such as fluoroethylene carbonate (FEC), fluorinated chain carbonate esters, and fluorinated chain carboxylate esters such as fluoromethyl propionate (FMP).

Examples of the electrolyte salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, and n is 1 or 2), $LiB_{10}Cl_{10}$, LiCl, LiBr, LiI, chloroborane lithium, lower aliphatic carboxylic acid lithiums, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (l and m are integers of 0 or greater). These electrolyte salts may be used singly, or a plurality thereof may be used as a mixture. The concentration of the electrolyte salt is, for example, 0.8 to 1.8 mol per L of the nonaqueous solvent.

EXAMPLES

Hereinbelow, the present disclosure will be further described based on EXAMPLES. However, it should be construed that the scope of the present disclosure is not limited to such EXAMPLES.

Example 1

[Fabrication of Positive Electrode]

$LiOH_3$ and $Ni_{0.80}Co_{0.10}Mn_{0.10}(OH)_2$ were mixed together so that the molar ratio of Li to the total amount of Ni, Co and Mn would be 0.90. Thereafter, the mixture was held at 900° C. for 5 hours (first calcination step) to give a calcined product of lithium composite oxide.

Next, LiOH and the calcined product of lithium composite oxide were mixed together so that the molar ratio of Li to the total amount of Ni, Co and Mn would be 0.15 mol. The mixture was held at 800° C. for 10 hours (second calcination step) to give a Ni-containing lithium transition metal oxide.

Figure 2:
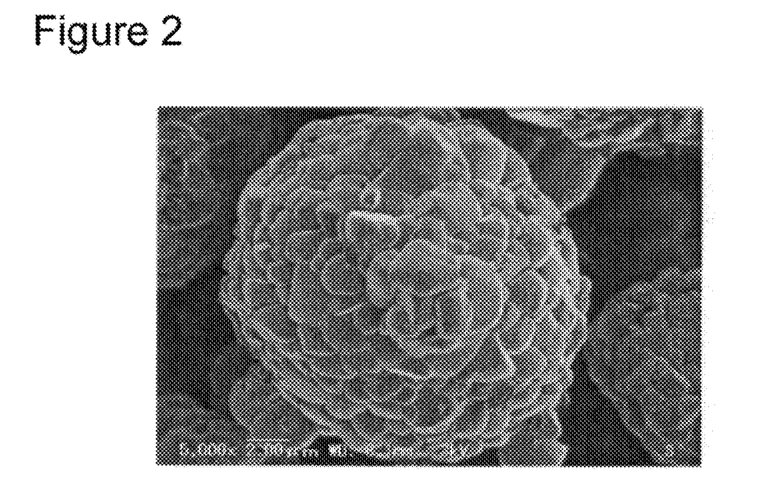
FIG. 2 is a view illustrating a SEM image of a Ni-containing lithium transition metal oxide of EXAMPLE 1.

FIG. 2 is a SEM image of the Ni-containing lithium transition metal oxide of this EXAMPLE. As shown in Figure 2, the Ni-containing lithium transition metal oxide of this EXAMPLE was in the form of secondary particles formed by the aggregation of primary particles. The average particle size of the primary particles of the Ni-containing lithium transition metal oxide was 0.7 μm, and the average particle size of the secondary particles was 8.3 μm. The method for the measurement of the average particle sizes was as described hereinabove.

Further, the Ni-containing lithium transition metal oxide was studied by X-ray diffractometry. The analysis of the X-ray diffraction pattern showed that the Ni disorder was 1.5% and the crystallite size was 120 nm. The conditions such as the X-ray diffractometry conditions were as described hereinabove.

Further, ICP emission analysis (using ICP emission spectrometer iCAP6300 manufactured by Thermo Fisher Scientific) of the Ni-containing lithium transition metal oxide showed that the composition was $Li_{1.05}Ni_{0.80}Co_{0.10}Mn_{0.10}O_2$.

The Ni-containing lithium transition metal oxide described above was used as a positive electrode active material. A mixture was prepared by mixing 97.5 mass % of the positive electrode active material, 1 mass % of carbon powder (carbon black) as a conductive agent, and 1.5 mass % of polyvinylidene fluoride powder as a binder. The mixture was mixed together with N-methyl-2-pyrrolidone (NMP) solution to give a slurry. The slurry was applied to both sides of a 15 μm thick positive electrode current collector made of aluminum by a doctor blade method. The wet films were dried and rolled with a press roller at a pressure of 500 MPa. Thus, a positive electrode was fabricated which had positive electrode mixture layers on both sides of the positive electrode current collector. The positive electrode current collector was free from the positive electrode mixture layer in the longitudinal central portion thereof, and a positive electrode tab was attached to that portion. The thickness of the positive electrode mixture layer was about 140 μm, and the total thickness of the mixture layers on both sides of the current collector was about 300 μm.

[Fabrication of Negative Electrode]

A mixture was prepared by mixing 98.2 mass % of graphite, 0.7 mass % of styrene-butadiene rubber and 1.1 mass % of sodium carboxymethylcellulose. The mixture was mixed together with water to give a slurry. The slurry was applied to both sides of a copper foil as a current collector by a doctor blade method. The wet films were dried and rolled with a press roller. Thus, a negative electrode was fabricated which had negative electrode mixture layers on both sides of the negative electrode current collector. The negative electrode current collector was free from the negative electrode mixture layer in both longitudinal end portions, and negative electrode tabs were attached to those portions. The thickness of the negative electrode mixture layer was about 120 μm, and the total thickness of the mixture layers on both sides of the current collector was about 250 μm.

[Preparation of Nonaqueous Electrolytic Solution]

$LiPF_6$ was dissolved with a concentration of 1.6 mol/L into a nonaqueous solvent including equal volumes of ethylene carbonate (EC) and diethyl carbonate (DEC). A nonaqueous electrolyte solution was thus obtained.

[Fabrication of Nonaqueous Electrolyte Secondary Battery]

A nonaqueous electrolyte secondary battery was fabricated in the following manner using the positive electrode, the negative electrode, the nonaqueous electrolytic solution and a separator. (1) The positive electrode and the negative electrode were wound together via a separator to form a wound electrode assembly. (2) The wound electrode assembly and insulating sheets arranged on and below the electrode assembly were placed into a cylindrical exterior case 18 mm in diameter and 65 mm in height. (3) The negative electrode current collector tabs were welded to the inner bottom surface of the exterior case, and the positive electrode current collector tab was welded to a bottom plate of a seal body. (4) The nonaqueous electrolytic solution was poured through the opening in the exterior case, and the exterior case was tightly closed with the seal body.

Example 2

LiOH and $Ni_{0.80}Co_{0.10}Mn_{0.10}(OH)_2$ were mixed together so that the molar ratio of Li to the total amount of Ni, Co and Mn would be 0.95. Thereafter, the mixture was held at 1000° C. for 5 hours (first calcination step) to give a calcined product of lithium composite oxide.

Next, LiOH and the calcined product of lithium composite oxide were mixed together so that the molar ratio of Li to the total amount of Ni, Co and Mn would be 0.10 mol. The mixture was held at 800° C. for 10 hours (second calcination step) to give a Ni-containing lithium transition metal oxide.

The average particle size of the primary particles of the Ni-containing lithium transition metal oxide was 1.8 μm, and the average particle size of the secondary particles was 8.5 μm. Further, the Ni-containing lithium transition metal oxide was studied by X-ray diffractometry. The analysis of the X-ray diffraction pattern showed that the Ni disorder was 2.0% and the crystallite size was 180 nm. Further, ICP emission analysis of the Ni-containing lithium transition metal oxide showed that the composition was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of EXAMPLE 2 was used as the positive electrode active material.

Example 3

LiOH and $Ni_{0.80}Co_{0.10}Mn_{0.10}(OH)_2$ were mixed together so that the molar ratio of Li to the total amount of Ni, Co and Mn would be 0.80. Thereafter, the mixture was held at 900° C. for 5 hours (first calcination step) to give a calcined product of lithium composite oxide.

Next, LiOH and the calcined product of lithium composite oxide were mixed together so that the molar ratio of Li to the total amount of Ni, Co and Mn would be 0.25 mol. The mixture was held at 800° C. for 10 hours (second calcination step) to give a Ni-containing lithium transition metal oxide.

The average particle size of the primary particles of the Ni-containing lithium transition metal oxide was 0.5 μm, and the average particle size of the secondary particles was 8.4 μm. Further, the Ni-containing lithium transition metal oxide was studied by X-ray diffractometry. The analysis of the X-ray diffraction pattern showed that the Ni disorder was 1.0% and the crystallite size was 100 nm. Further, ICP emission analysis of the Ni-containing lithium transition metal oxide showed that the composition was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of EXAMPLE 3 was used as the positive electrode active material.

Comparative Example 1

LiOH and $Ni_{0.80}Co_{0.10}Mn_{0.10}(OH)_2$ were mixed together so that the molar ratio of Li to the total amount of Ni, Co and Mn would be 1.05. Thereafter, the mixture was held at 700° C. for 20 hours to give a Ni-containing lithium transition metal oxide.

Figure 3:
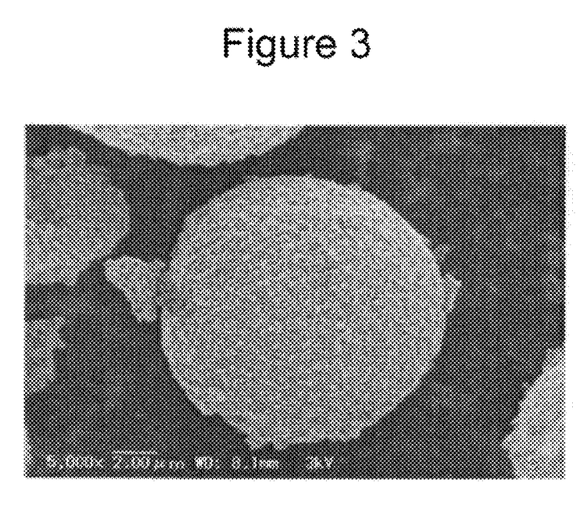
FIG. 3 is a view illustrating a SEM image of a Ni-containing lithium transition metal oxide of COMPARATIVE EXAMPLE 1.

FIG. 3 is a SEM image of the Ni-containing lithium transition metal oxide of COMPARATIVE EXAMPLE 1. As shown in FIG. 3, the Ni-containing lithium transition metal oxide of COMPARATIVE EXAMPLE 1 was in the form of secondary particles formed by the aggregation of primary particles. The particle size of the primary particles was smaller than that in EXAMPLE 1, and the number of the primary particles per secondary particle was larger than that in EXAMPLE 1.

The average particle size of the primary particles of the Ni-containing lithium transition metal oxide of COMPARATIVE EXAMPLE 1 was 0.05 μm, and the average particle size of the secondary particles was 8.0 μm. Further, the Ni-containing lithium transition metal oxide of COMPARATIVE EXAMPLE 1 had a Ni disorder of 1.0% and a crystallite size of 100 nm. Further, the composition of the Ni-containing lithium composite oxide of COMPARATIVE EXAMPLE 1 was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of COMPARATIVE EXAMPLE 1 was used as the positive electrode active material.

Comparative Example 2

LiOH and $Ni_{0.80}Co_{0.10}Mn_{0.10}(OH)_2$ were mixed together so that the molar ratio of Li to the total amount of Ni, Co and Mn would be 0.95. Thereafter, the mixture was held at 1000° C. for 5 hours (first calcination step) to give a calcined product of lithium composite oxide.

Next, LiOH and the calcined product of lithium composite oxide were mixed together so that the molar ratio of Li to the total amount of Ni, Co and Mn would be 0.10 mol. The mixture was held at 950° C. for 10 hours (second calcination step) to give a Ni-containing lithium transition metal oxide.

The average particle size of the primary particles of the Ni-containing lithium transition metal oxide was 2.1 μm, and the average particle size of the secondary particles was 8.2 μm. Further, the Ni-containing lithium transition metal oxide was studied by X-ray diffractometry. The analysis of the X-ray diffraction pattern showed that the Ni disorder was 3.1% and the crystallite size was 210 nm. Further, ICP emission analysis of the Ni-containing lithium transition metal oxide showed that the composition was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of COMPARATIVE EXAMPLE 2 was used as the positive electrode active material.

Comparative Example 3

LiOH and $Ni_{0.80}Co_{0.10}Mn_{0.10}(OH)_2$ were mixed together so that the molar ratio of Li to the total amount of Ni, Co and Mn would be 0.80. Thereafter, the mixture was held at 650° C. for 5 hours (first calcination step) to give a calcined product of lithium composite oxide.

Next, LiOH and the calcined product of lithium composite oxide were mixed together so that the molar ratio of Li to the total amount of Ni, Co and Mn would be 0.25 mol. The mixture was held at 800° C. for 10 hours (second calcination step) to give a Ni-containing lithium transition metal oxide.

The average particle size of the primary particles of the Ni-containing lithium transition metal oxide was 0.4 μm, and the average particle size of the secondary particles was 8.3 μm. Further, the Ni-containing lithium transition metal oxide was studied by X-ray diffractometry. The analysis of the X-ray diffraction pattern showed that the Ni disorder was 1.4% and the crystallite size was 110 nm. Further, ICP emission analysis of the Ni-containing lithium transition metal oxide showed that the composition was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of COMPARATIVE EXAMPLE 3 was used as the positive electrode active material.

Comparative Example 4

LiOH and $Ni_{0.80}Co_{0.10}Mn_{0.10}(OH)_2$ were mixed together so that the molar ratio of Li to the total amount of Ni, Co and Mn would be 1.05. Thereafter, the mixture was held at 780° C. for 5 hours (first calcination step) to give a calcined product of lithium composite oxide. Next, the calcined product of lithium composite oxide was held at 1000° C. for 20 hours (second calcination step) to give a Ni-containing lithium transition metal oxide.

Figure 4:
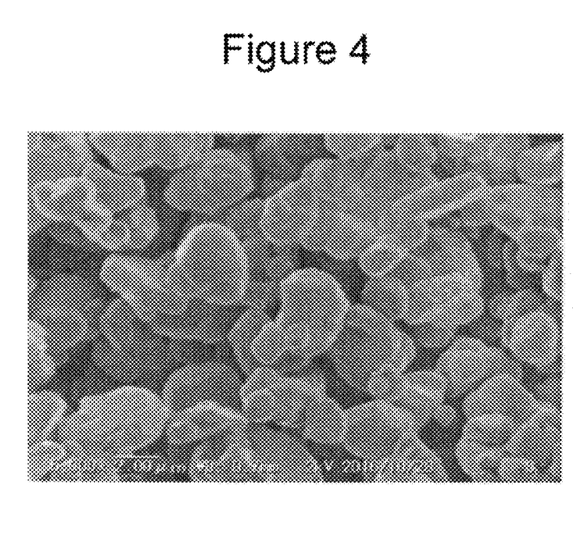
FIG. 4 is a view illustrating a SEM image of a Ni-containing lithium transition metal oxide of COMPARATIVE EXAMPLE 4.

FIG. 4 is a SEM image of the Ni-containing lithium transition metal oxide of COMPARATIVE EXAMPLE 2. The Ni-containing lithium transition metal oxide of COMPARATIVE EXAMPLE 2 was composed of individual primary particles, and secondary particles formed by the aggregation of a few primary particles.

The average particle size of the primary particles of the Ni-containing lithium transition metal oxide of COMPARATIVE EXAMPLE 4 was 3.1 μm, and the average particle size of the secondary particles was 4.5 μm. Further, the Ni-containing lithium transition metal oxide of COMPARATIVE EXAMPLE 2 had a Ni disorder of 4.2% and a crystallite size of 350 nm. Further, the composition of the Ni-containing lithium composite oxide of COMPARATIVE EXAMPLE 2 was $Li_{1.05}Ni_{0.80}Co_{0.10}Mn_{0.10}O_2$.

A nonaqueous electrolyte secondary battery was fabricated in the same manner as in EXAMPLE 1, except that the Ni-containing lithium transition metal oxide of COMPARATIVE EXAMPLE 4 was used as the positive electrode active material.

<Measurement of Battery Capacity>

In an environment at 25° C., the nonaqueous electrolyte secondary batteries were each charged at a constant current of 1 It=2400 mA to a battery voltage of 4.3 V and, after the battery voltage had reached 4.3 V, were each discharged at a constant current of 1 It=2400 mA until the battery voltage fell to 2.5 V. The discharge capacity in this process was divided by the weight of the positive electrode active material to give a capacity per unit weight of the positive electrode active material (mAh/g). The results are described in Table 1.

<Measurement of Amount of DSC Heat Generation>

In an environment at 25° C., the nonaqueous electrolyte secondary batteries were each charged at a constant current of 1 It=2400 mA to a battery voltage of 4.3 V. Thereafter, the batteries were disassembled and the positive electrodes were removed. After the nonaqueous electrolytic solution on the positive electrode was removed, 1 mg of the positive electrode active material layer was scraped off and was sealed, together with 1 μL of the nonaqueous electrolytic solution, into a pressure-resistant hermetic container to form a specimen. The specimen was heated on a differential scanning calorimeter (DSC) from 25° C. to 400° C. at a heat-up rate of 10° C./min, and the amount of heat generation (DSC heat generation) was measured. The larger the amount of DSC heat generation, the lower the thermal stability.

<Measurement of Amount of Gas>

In an environment at 25° C., the nonaqueous electrolyte secondary batteries were each charged at a constant current of 1 It=2400 mA to a battery voltage of 4.3 V. Thereafter, the batteries were disassembled and the positive electrodes were removed. After the nonaqueous electrolytic solution on the positive electrode was removed, 2 mg of the positive electrode active material was scraped off and was added to a heating device. The device was then purged with an inert gas (He gas), and the sample was heated from 25° C. to 500° C. at a heat-up rate of 20° C./min. The amount of gas generated from the sample during the heating was determined with a gas chromatography-mass spectrometer.

Table 1 describes the conditions for the synthesis of the Ni-containing lithium transition metal oxides in EXAMPLES and COMPARATIVE EXAMPLES, the average primary and secondary particle sizes (diameters), the Ni disorders and the crystallite sizes.

TABLE 1

| | Ni-containing lithium transition metal oxides | | | | | | | |
|---|---|---|---|---|---|---|---|---|
| | Synthetic conditions | | | | | | | |
| | First calcination step | | Second calcination step | | | | | |
| | Li molar ratio | Calcination temperature (° C.) | Li molar ratio | Calcination temperature (° C.) | Primary particle size (μm) | Secondary particle size (μm) | Ni disorder (%) | Crystallite size (nm) |
| EX. 1 | 0.90 | 900 | 0.15 | 800 | 0.7 | 8.3 | 1.5 | 120 |
| EX. 2 | 0.95 | 1000 | 0.10 | 800 | 1.9 | 8.5 | 2.0 | 180 |
| EX. 3 | 0.80 | 900 | 0.25 | 800 | 0.5 | 8.4 | 1.0 | 100 |
| COMP. EX. 1 | 1.05 | 700 | — | — | 0.05 | 8.0 | 1.0 | 100 |
| COMP. EX. 2 | 0.95 | 1000 | 0.10 | 950 | 2.1 | 8.2 | 3.1 | 210 |
| COMP. EX. 3 | 0.80 | 650 | 0.25 | 800 | 0.4 | 8.3 | 1.4 | 110 |
| COMP. EX. 4 | 1.05 | 780 | — | 1000 | 3.1 | 4.5 | 4.2 | 350 |

Table 2 describes the discharge capacities, the amounts of DSC heat generation and the amounts of gas determined in EXAMPLES and COMPARATIVE EXAMPLES. In Table 2, the amounts of DSC heat generation in EXAMPLES 2 and 3 and COMPARATIVE EXAMPLES 1 to 4 are values relative to the amount of DSC heat generation in EXAMPLE 1 taken as the reference (100). In Table 2, the amounts of gas in COMPARATIVE EXAMPLES 1 and 2 are values relative to the amount of gas in EXAMPLE 1 taken as the reference (100).

TABLE 2

| | Discharge capacity (mAh/g) | Amount of DSC heat generation | Amount of gas |
|---|---|---|---|
| EX. 1 | 200 | 100 | 100 |
| EX. 2 | 195 | 98 | 95 |

TABLE 2-continued

|  | Discharge capacity (mAh/g) | Amount of DSC heat generation | Amount of gas |
|---|---|---|---|
| EX. 3 | 201 | 102 | 101 |
| COMP. EX. 1 | 201 | 130 | 120 |
| COMP. EX. 2 | 170 | 97 | 94 |
| COMP. EX. 3 | 200 | 110 | 110 |
| COMP. EX. 4 | 160 | 100 | 100 |

COMPARATIVE EXAMPLE 1 compared almost equally to EXAMPLES in discharge capacity but resulted in larger amounts of DSC heat generation and gas generation. While the amounts of DSC heat generation and the amounts of gas generation in COMPARATIVE EXAMPLES 2 and 4 were similar to those in EXAMPLES 1 and 2, the discharge capacities were lowered. These results conclude that a Ni-containing lithium transition metal oxide having a Ni proportion of not less than 80 mol % relative to the total number of moles of metal element(s) except Li can attain a smaller decrease in thermal stability with less lowering in battery capacity and less generation of gas in a hot environment by being designed so that the average particle size of the primary particles is not less than 0.5 μm, the average particle size of the secondary particles is not less than 8 μm, the Ni disorder is not more than 3% and the crystallite size is in the range of 100 to 200 nm.

REFERENCE SIGNS LIST

30 SECONDARY PARTICLE
31 PRIMARY PARTICLE
32 VOID

The invention claimed is:

1. A positive electrode active material for nonaqueous electrolyte secondary batteries comprising a Ni-containing lithium transition metal oxide in form of secondary particles formed by aggregation of primary particles of the oxide,
the proportion of Ni in the lithium transition metal oxide being not less than 80 mol % relative to the total number of moles of metal element(s) except Li,
the average particle size of the primary particles being in the range of 0.5 μm to 2 μm,
the average particle size of the secondary particles being not less than 8 μm,
the lithium transition metal oxide having a Ni disorder in the range of 1% to 2% and a crystallite size in the range of 100 to 200 nm according to X-ray diffractometry.

2. The positive electrode active material for nonaqueous electrolyte secondary batteries according to claim 1, wherein the average particle size of the secondary particles is in the range of 8 to 20 μm.

3. The positive electrode active material for nonaqueous electrolyte secondary batteries according to claim 1, wherein the lithium transition metal oxide includes at least one element selected from Co, Mn, Mg, Zr, Mo, W, Al, Cr, V, Ce, Ti, Fe, K, Ga and In.

4. The positive electrode active material for nonaqueous electrolyte secondary batteries according to claim 1, wherein the lithium transition metal oxide includes at least one of Co and Mn and further includes at least one element selected from Mg, Zr, Mo, W, Al, Cr, V, Ce, Ti, Fe, K, Ga and In.

5. A nonaqueous electrolyte secondary battery comprising a positive electrode including a positive electrode active material, a negative electrode and a nonaqueous electrolyte, the positive electrode active material comprising the positive electrode active material for nonaqueous electrolyte secondary batteries described in claim 1.

6. The positive electrode active material for nonaqueous electrolyte secondary batteries according to claim 1, wherein the average particle size of the secondary particles is in the range of 10 μm to 18 μm.

* * * * *